May 13, 1930. S. C. G. EKELUND 1,758,786
PROCESS OF AND FURNACE FOR EXTRACTING METALS FROM ORES
Filed Oct. 15, 1926 2 Sheets-Sheet 1
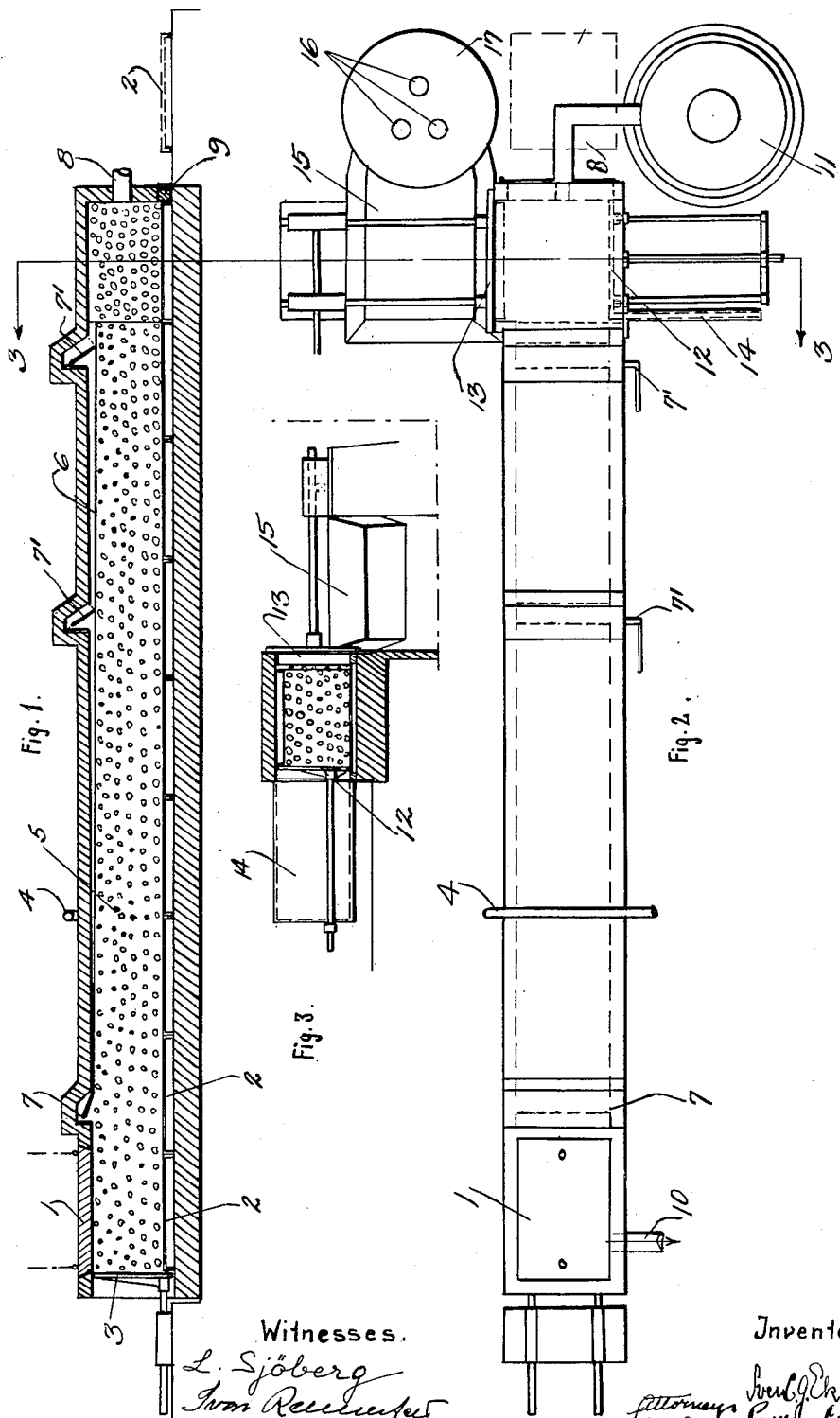

May 13, 1930.   S. C. G. EKELUND   1,758,786
PROCESS OF AND FURNACE FOR EXTRACTING METALS FROM ORES
Filed Oct. 15, 1926   2 Sheets-Sheet 2
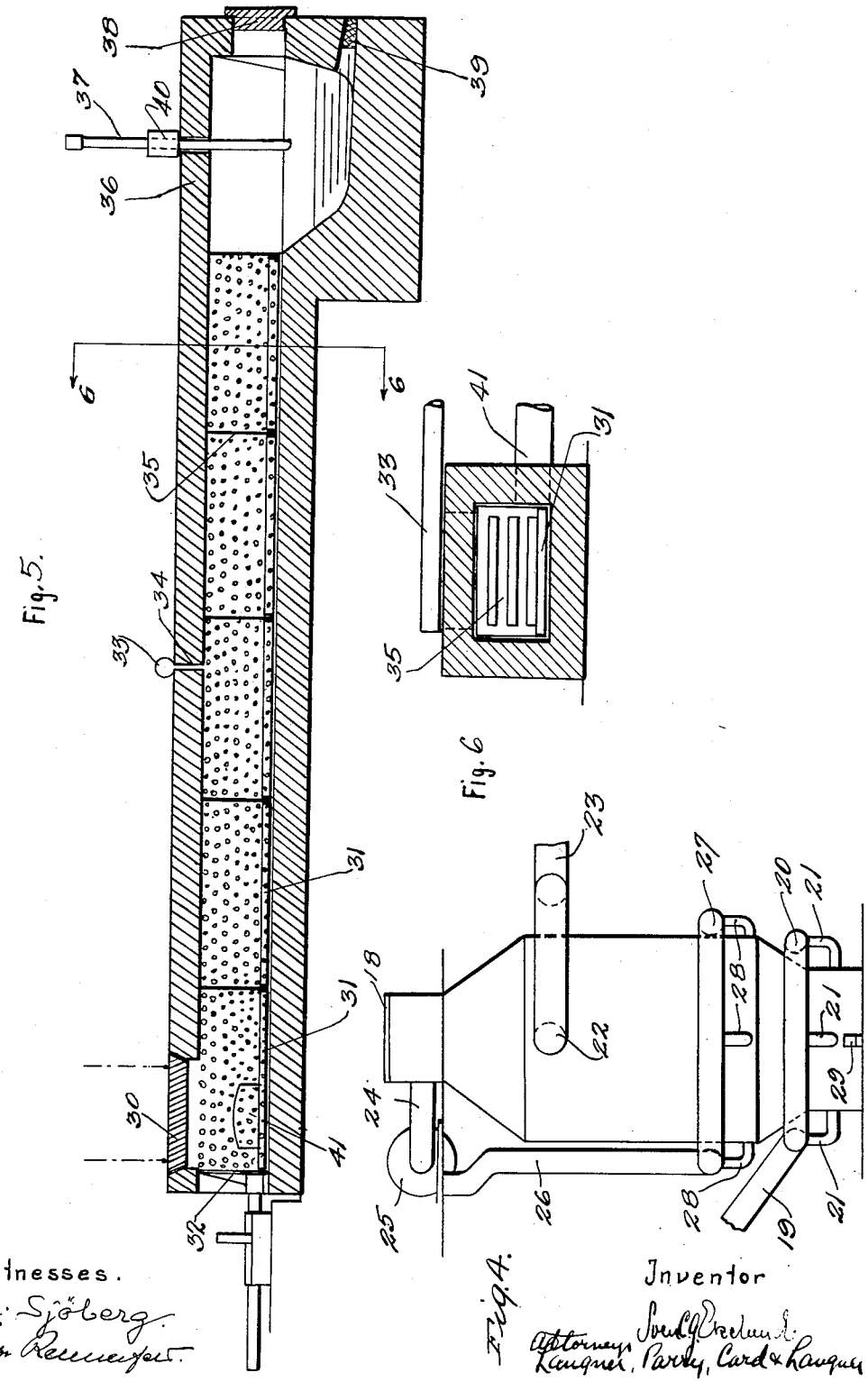

Patented May 13, 1930

1,758,786

UNITED STATES PATENT OFFICE

SVEN CARL GUNNAR EKELUND, OF KARSKRONA, SWEDEN

PROCESS OF AND FURNACE FOR EXTRACTING METALS FROM ORES

Application filed October 15, 1926, Serial No. 141,830, and in Sweden October 19, 1925.

My invention relates to a new process of extracting a metal from an ore, especially iron ore, as well as to certain improvements in metallurgical furnaces required for a successful utilization of the process.

The invention has for its principal objects, first, to facilitate a rational and economical utilization of the reducing material; second, to decrease the amount of carbon etc. required for the reduction of the ore, the manual labour and the wear and tear on the furnaces; third, to afford means for extracting iron in the shape of a soft, spongy metal, low in carbon and suitable for being directly melted in an electric furnace; fourth, to conduct the process so as to substantially diminish the heat losses and; fifth, to provide a system of metallurgical furnaces adapted to produce a finished metal by simultaneously melting the treated ore, preferably in an electric oven.

In general the object of my invention is to solve in a commercial and technically successful way the difficult problem of producing a soft or hard steel of high quality by what is known in the art as a process of direct reduction and melting.

I attain the objects enumerated above by proceeding substantially in the following manner.

In the accompanying drawings,

Fig. 1 shows a longitudinal section through a tunnel-furnace for complete reduction by means of gas.

Fig. 2 is a plan view of the tunnel-furnace and of an electric furnace combined therewith for melting of the reduced ore.

Fig. 3 is an end view with a section of the furnace on the line 3—3 in Figs. 1 and 2.

Fig. 4 illustrates a gas producer from which is obtained the reducing gas.

Fig. 5 represents a longitudinal vertical section of a tunnel-furnace for partial reduction of the ore and of an electric furnace combined therewith for the complete reduction and melting of the ore.

Fig. 6 represents a vertical cross section on line 6—6 in Fig. 5.

Referring now in detail to the several figures and adverting first to Figs. 1-3, the furnace is of the longitudinal type and as a loose cover or lid at 1. This normally closes the opening for charging the ore. The furnace bottom is constituted by traveling plates 2, intended to carry the ore and introduced successively into the furnace for receiving the charge. A plate 3, being part of a pushing mechanism, closes the end of the furnace chamber. A pipe 4 is provided about halfway from either end and serves for introducing air for combustion purposes through tuyères 5. A plate 6 is suspended underneath the roof, pivoted on a horizontal axis 7 and adapted to rest on top of the ore through its entire length.

This plate is intended to prevent the gases from escaping through an empty space, which may possibly develop above the ore, if the upper surface has a tendency to sink downwards due to settling of the ore during the process. The gases are prevented from passing along above the plate 6 by means of dampers 7'. A pipe 8 serves as an inlet for the gas from a producer 11. The bottom plates 2 are pushed out from the furnace through the opening 9, which is provided with a normally closed door. The waste gases are withdrawn through an opening 10 at the front of the furnace and may be used for several purposes, such as preheating the air blast for the gas producer 11, if the combustion of the gas is not complete. By means of the plate 12, which is movable transversely of the furnace and placed inside of the furnace wall, the ore may be discharged through an opening, provided with a door 13. The plate 12 and the door 13 are both operated mechanically in any way, known in the art, and not shown.

The plate 12 is provided with a side wall 14, located at right angles to the plate in order that ore may be kept from falling forward behind the said plate. The sponge metal and the gangue tumbles down into a bed 15, from where it is then moved to an electric furnace 17, having electrodes 16.

Referring to the Fig. 4 in which the details of the gas producer are shown, a lid 18 closes an opening, through which uncoked, partly coked or coked fuel and such additions, as may be required, are introduced into the producer. The air blast is admitted by means of blast tubes 19, an annular tube 20 and tuyères 21.

The gas is withdrawn by means of discharge openings 22 and gas pipings 23. The gas rising upwards in the producer divides near the outlets, so that a certain amount flows further upwards through uncoked layers of fuel, pulling with it distilling gases and leaving the producer through the piping system 24, passing preferably through some well known cleaning means to the blower 25, from where it passes along the conduct 26, the annular tube 27 and the tuyères 28 into the producer preferably slightly above the tuyères of the air blast. The liquid slag is tapped through an opening 29.

Referring to the Figs. 5 and 6 in which a modification of the invention is shown, a removable cover is denoted by 30. This normally closes an opening for charging ore into the furnace. The bottom is covered by plates 31, which carry the ore along the furnace shaft. A plate 32, being part of a feeding mechanism, covers a corresponding opening in the end of the furnace. Air blast is admitted through the pipe 33 and the narrow slot 34. Plates 35 divide the charge into definite amounts and are provided with holes or slots, permitting the gases to pass by. The electric furnace 36 has electrodes 37, a discharge opening 29 and a working opening 38. The electrodes are movable and provided with gas tight stuffing boxes 40 of any preferred construction. The furnace gases are withdrawn through the opening 41, in carrying out the process, utilizing the apparatus as above described.

The ore is charged at one end of an elongated, preferably horizontal or slightly inclined tunnel-furnace of the stationary type through an opening in the roof, normally covered by a lid. The ore is placed on a loose, interior furnace bottom, movable with the ore along the furnace from one end to the other by any suitable mechanical means, gravity not being relied upon for moving the ore as in the blast furnaces or in other, steeply inclined furnaces previously well known in the art. The tunnel-furnace is to be charged completely with the ore and other materials such as scrap iron or limestone in the following manner. After a suitable quantity of ore is charged through the opening on the movable bottom, the bottom with the ore is moved one definite step forward into the furnace shaft. By repeating the charging process in this way the furnace is gradually charged to its full length and height with ore.

In this tunnel-furnace the ore is preheated to a fairly high temperature by the combustion of combustible gases which have already served as reducing gases for reduction of previously heated portions of ore in the tunnel-furnace, but care must be taken that the ore does not start to melt on account of this preheating. The hot reducing gases are obtained from a suitable source such as a gas producer and introduced, preferably at that end of the furnace, where the preheated ore is discharged, but also at other places, if desired.

Air is introduced into the furnace at any preferred distance from the end thereof causing combustion of the combustible gases whereby the ore is preheated, before it is subjected to the reducing action of the reducing gases. The wholly or partly reduced ore, obtained from the tunnel-furnace, may be discharged directly therefrom in an electrical smelting furnace, in which it may be melted together with coal for complete reduction or for carburization; the gases produced by melting together with coal are introduced into the tunnel-furnace as reducing gases.

By thoroughly preheating the ore the temperature, which is most suitable for performing the reduction process, is quickly reached, and the ore may absorb a large amount of heat, which may be conveniently employed later on in the process for the reduction itself and for covering the heat losses in the furnace or system of furnaces, required according to my invention. I may, thus, in an efficient way utilize the well known ability of the ore of absorbing and storing considerable quantities of heat. The reducing gases are compelled to mix quite thoroughly in the tunnel-furnace with the ore, which is in this way heated more quickly and efficiently than would be the case, if the gas were permitted to pass along in an empty space above a charge of ore not completely filling the space.

It is clear, too, that the reducing gas is being more economically utilized in this way than in other furnaces of the rotary, elongated type, in which the ore is fed forward by the rotary motion, which causes also a considerable wear and tear on account of the grinding action of the ore.

The heat losses are also less, because the external surface of the furnace in relation to the tonnage of the ore per unit length of the furnace shaft is much less in a furnace such as covered by my invention, said losses being quite extensive in the rotating, tubular type of furnaces. Still another advantage is, that there is much less danger of troubles and annoyances on account of the ore getting soft and sticky, because the ore is moved forward mechanically in a definite manner and not by gravity as in a vertical shaft furnace or by friction against a rotating furnace wall. In order to facilitate the moving of the loose interior furnace bottom with the ore in the furnace his bottom may consist of supporting plates, resting on rollers or balls. The plates may also be provided with wheels or they may be attached to some transporting means such as chains or cables, movable along the furnace. To decrease the friction of the ore against the side walls of the furnace, plates of cast or rolled iron or non-oxidizing materials may be used, said plates being applied as lining of the brick walls.

The hot, reducing gas, substantially consisting of carbon monoxide or hydrogen or of a mixture of said gases, may be manufactured in a producer of the type, particularly one in which any ash contents of the fuel is caused to melt, thus facilitating its removal in a liquid form. A gas producer of this type is especially suitable, because the gas obtained may be delivered at a high pressure and hot enough to be used in the reduction process without being previously preheated.

It is desirable to use for iron ore reduction processes a gas containing only a small percentage of hydrocarbon, steam and carbondioxide because, in the presence of hydrocarbons a very undesirable deposition of solid carbon, badly clogging the furnace, may take place, whereas steam and $CO_2$ are detrimental to the utilization of the producer gas in the most economical way. It is to be noted, however, that some steam or $CO_2$ should be present in the furnace, because otherwise the soft, spongy metal is liable to carburization by the strongly reducing gas mixture.

The iron sponge, thus obtained from the ore in the tunnel furnace, is removed without being melted. It contains a certain amount of useless minerals, gangue, etc., and may be charged directly into an electric furnace, or it may be subjected to a separate process in order to obtain pure, soft iron, which may then be compressed into pieces of a suitable shape, constituting a most valuable raw material for the steel making process. The direct transportation of the sponge to the electric furnace may take place in any preferred manner. The iron may be pushed out from the hot end of the reducing furnace by means of a plunger, the furnace wall being provided with an opening, normally closed by a door or cover.

The iron may then be caused to slide along an inclined bed or trough into the melting furnace. It is also possible to use a movable melting hearth being part of an electric furnace and placed closed to the reducing furnace, so that the iron may be pushed directly into said hearth, which is then removed to its proper place for melting the hot iron sponge. In this case the movable hearth is to oscillate with a certain regularity between the place, where it is loaded with iron sponge from the reduction furnace and the place, where the iron is to be melted. In case the movable melting hearth is used for closing the opening in the reduction furnace, which may be in its floor, then at least two such melting hearths are for obvious reasons required to permit an uninterrupted operation, one being used for closing the reduction furnace, while the other is used for melting a charge. If the ore is supported on movable plates or flat cars, those are to be brought back to the charging end of the furnace after having been unloaded from the burden of reduced metal.

If the ore is not completely reduced in the tunnel-furnace the final reduction takes place in the electrical furnace by means of a solid reducing material. The electrical furnace should be directly connected to the hot end of the tunnel-furnace, forming with this a gas tight unit, capable of sustaining a certain inside gas pressure. According to the process preferably the major part of the reducing material, consisting of smalls and fines of coal is first placed on the bottom of the furnace, whereafter a definite quantity of hot ore is charged on top and melted together with the coal.

When the reduction has taken place, the strongly iron holding slag, covering the reduced iron underneath, is being reduced by adding coal, even in some excess, as the iron is not liable to absorb more carbon than wanted.

The bath of iron may then be teemed into a ladle and taken to a special refining furnace, whereafter the furnace is made ready to receive a fresh charge of coal and ore.

It is clear, that the reduction and melting may be combined with a continuous feeding of ore and coal into the melting furnace, but it is more easy and convenient to charge just enough ore and coal in the proper amounts, if the process is not strictly continuous. It, thus, becomes possible to charge very definite amounts of ore in the tunnel-furnace and to separate the individual quantities from each other by means of plates or sheets, scrap iron or the like. When using plates these should be of the same size as the section of the furnace chamber and provided with holes, permitting the furnace gases to pass through, spreading uniformly all over the section.

The apparatus covered by my invention makes it possible to handle the ore at high temperatures without the difficulties inherent with most of the furnaces or combinations of furnaces previously proposed and operated for similar purposes.

It is obvious, that I do not wish to limit myself to using the process and apparatus only for treating iron ore, since the invention may be applied to reducing any ore, which is adapted for treatment as described hereabove.

Having now fully disclosed my invention, I claim and desire to secure by Letters Patent of the United States:

1. In a furnace system for extracting a metal from an ore, the combination with a stationary, substantially horizontal tunnel-furnace of a plunger at the charging end of the furnace, loose bottom plates, composing a movable inside bottom, adapted to carry the burden of ore and to be pushed forward along the furnace by means of said plunger, means for discharging treated ore at the other end of the furnace, tubing for introducing hot reducing gas into the furnace, tubes for introducing air for combustion into the furnace, and flues for withdrawing waste gases.

2. In a furnace system for extracting a metal from an ore, the combination with a stationary, substantially horizontal tunnel-furnace of a plunger at the charging end of the furnace, carriers, consisting of loose bottom plates, composing a movable inside bottom, adapted to carry the burden of the ore and to be pushed forward along the furnace by means of said plunger, means for removing the plates and the treated ore at the discharge end of the tunnel-furnace, tubes for introducing hot reducing gas into the tunnel-furnace, tubes for introducing air for combustion into the tunnel-furnace, and flues for withdrawing waste gases.

3. In a furnace system for extracting a metal from an ore, the combination with a stationary, substantially, horizontal tunnel-furnace of a plunger at the charging end of the furnace, loose bottom plates, provided with wheels and comprising a movable inside bottom, adapted to carry the burden of the ore and to be pushed forward along the furnace by means of said plunger, means for removing the plates and the treated ore at the discharge end of the tunnel-furnace, tubes for introducing hot reducing gas into the tunnel-furnace, tubes for introducing air for combustion into the tunnel-furnace, and flues for withdrawing waste gases.

4. The process of treating ore in a stationary, substantially horizontal tunnel-furnace, comprising introducing the ore in successive batches into the one end of the furnace and a stream of hot reducing gas from any source at a point adjacent the other end, letting the gas counter-flow-wise meet the ore, the same gas only once passing the furnace channel, spreading the gas uniformly over the furnace section by means of bringing the ore to fill the furnace channel to its whole height, width and length, causing the upper surface of the whole ore charge to come in close contact with the furnace roof, moving the ore batches step by step together with a movable inside furnace bottom through the furnace, successively charging fresh ore into the one end and discharging treated ore from the other, and preheating the ore prior to its reduction by introducing air into the reducing gas stream at a suitable point adjacent the charging end of the furnace for the combustion of reducing gas, which has already performed its essential reducing function, drawing off the flue gases at the charging end of the furnace.

Signed at Stockholm, Sweden this 30th day of September, A. D. 1926.

SVEN CARL GUNNAR EKELUND.